United States Patent

[11] 3,581,758

| [72] | Inventor | Norman Czajkowski<br>Chevy Chase, Md. |
|------|----------|---------------------------------------|
| [21] | Appl No. | 869,030 |
| [22] | Filed | Oct. 24, 1969 |
| [45] | Patented | June 1, 1971 |
| [73] | Assignee | The United States of America as represented by the Secretary of the Navy |

[54] FLUIDIC-MECHANICAL OSCILLATOR
12 Claims, 5 Drawing Figs.

| [52] | U.S. Cl. | 137/81.5 |
|------|----------|----------|
| [51] | Int. Cl. | F15c 1/08, F15c 3/00 |
| [50] | Field of Search | 137/81.5 |

[56] References Cited
UNITED STATES PATENTS

| 3,082,781 | 3/1963 | Moosmann | 137/81.5X |
| 3,260,271 | 7/1966 | Katz | 137/81.5X |
| 3,275,015 | 9/1966 | Meier | 137/81.5 |
| 3,371,540 | 3/1968 | Colombani et al | 137/81.5X |
| 3,410,290 | 11/1968 | Phillips | 137/81.5 |
| 3,439,695 | 4/1969 | Bauer | 137/81.5 |
| 3,454,025 | 7/1969 | Egli | 137/81.5 |
| 3,489,161 | 1/1970 | Rexford | 137/81.5X |
| 3,500,850 | 3/1970 | Kelley | 137/81.5 |

*Primary Examiner*—Samuel Scott
*Attorneys*—R. S. Sciascia and J. A. Cooke

ABSTRACT: A fluidic mechanical oscillator having a bar with a central hollow hub mounted for rotating oscillation about an axis through the hub. A cylindrical drum rigidly mounted on a low-pressure air pipe is enclosed within a closed hub chamber leaving an annular space between the interior wall of the rotating hub and outside wall of the fixed drum. Within the annular space are placed a pair of ribbon roll valves, each consisting of a closed loop of flexible material which rolls with the rotating hub to open a pair of ports in the hub wall for only a few degrees of the bar's oscillation and release a puff of pressurized fluid out of the ports. The fluid exits in a pair of jets at the ends of the bar directed tangentially and opposite to the direction of rotation of the bar and in phase with the oscillation. A portion of the jet is also released radially outward against an escapement release lever to provide the incremental time base for a timer.

PATENTED JUN 1 1971

INVENTOR
Norman Czajkowski

BY
J. O. Tresansky
ATTORNEY 3,581,758

FLUIDIC-MECHANICAL OSCILLATOR

BACKGROUND OF THE INVENTION

This invention relates generally to oscillators for timers, and more specifically to a fluidic mechanical oscillator for highly accurate timers capable of functioning in intense electromagnetic and particle radiation.

In environments of high electromagnetic or particle radiation, an ultra-accurate timer is frequently required to automatically control the course of certain sequentially programmed operations, such for example as an experiment where the time lapse between operations is critical and where close scrutiny by the experimentor is impracticable. There are existing prior art timers of sufficient precision to satisfy these very exacting accuracy requirements, such for example as tuning fork oscillator timers, but the magnetic cores and solid-state components needed for the operation of these ultra-accurate timers are vulnerable to high intensity radiation and suffer a deterioration of performance or complete destruction after exposure of any appreciable duration to such radiation, and hence are not suitable for this application.

In turn, mechanical timers are generally not subject to the same sensitivity to radiation, but rather suffer from accuracy limitations arising from structural features common to all mechanical timers. A reaction force develops at the bearings of the balance wheel of the mechanical escapement because its attachment to the hair spring is at a single point around the periphery of the balance wheel shaft. Moreover, another reaction force at the bearings develops where the balance wheel releases its kinetic energy to lift the escape lever off its banked position. Finally, as the escape lever applies its impulse to the balance wheel, another reaction force is generated at the balance wheel bearings, These considerations are believed to account, in part, for the unsatisfactory accuracy obtainable from prior art mechanical timers.

Fluidic timers are relatively wasteful of the operating fluid since they maintain a constantly open channel for the escape of the fluid. Moreover, they are based on the frequency of a fluidic "oscillator" which is variable with the temperature and pressure of the operating fluid, and hence, require constant monitoring. In this application, the timer must be hardy and capable of extended highly accurate operation without the need for constant monitoring. Because of these inherent limitations in prior art timers the need has long existed for an ultra-accurate oscillator for a mechanical timer capable of withstanding intense radiation.

SUMMARY OF THE INVENTION

Accordingly, one object of the invention is to provide an oscillator for a timer having a high degree of accuracy.

Another object of this invention is to provide an oscillator for an accurate timer that is immune to the effect of intense radiation.

Still another object of the present invention is to provide an oscillator for an accurate timer that requires no maintenance or control of conditions and needs only a source of pressurized fluid for its operation.

Still another object of the present invention is to provide an oscillator for an accurate timer employing a unidirectional energy flow from the oscillator to provide a combination of ruggedness and accuracy not previously available in mechanical timers.

A further object of the instant invention is to provide a simple, rugged, reliable, durable, fluid mechanical oscillator for a timer that is extremely efficient and accurate.

Briefly, in accordance with one embodiment of this invention these and other objects are attained by providing a spring-mass system mounted for oscillating rotation about an axis. A frictionless valve mounted within a hollow chamber in the mass releases puffs of pressurized fluid in phase with the rotation of the mass and the fluid exits through tangentially disposed jets at diametrically opposed ends of the mass to supply the energy increment needed to compensate for frictional losses in the mounting of the mass.

BRIEF DESCRIPTION OF THE DRAWING

A more complete appreciation of the invention and its many attendant advantages will develop as the same becomes better understood by reference to the following detailed description when considered in connection with the accompanying drawings wherein.

DESCRIPTION OF THE PREFERRED EMBODIMENT

Figure 1:
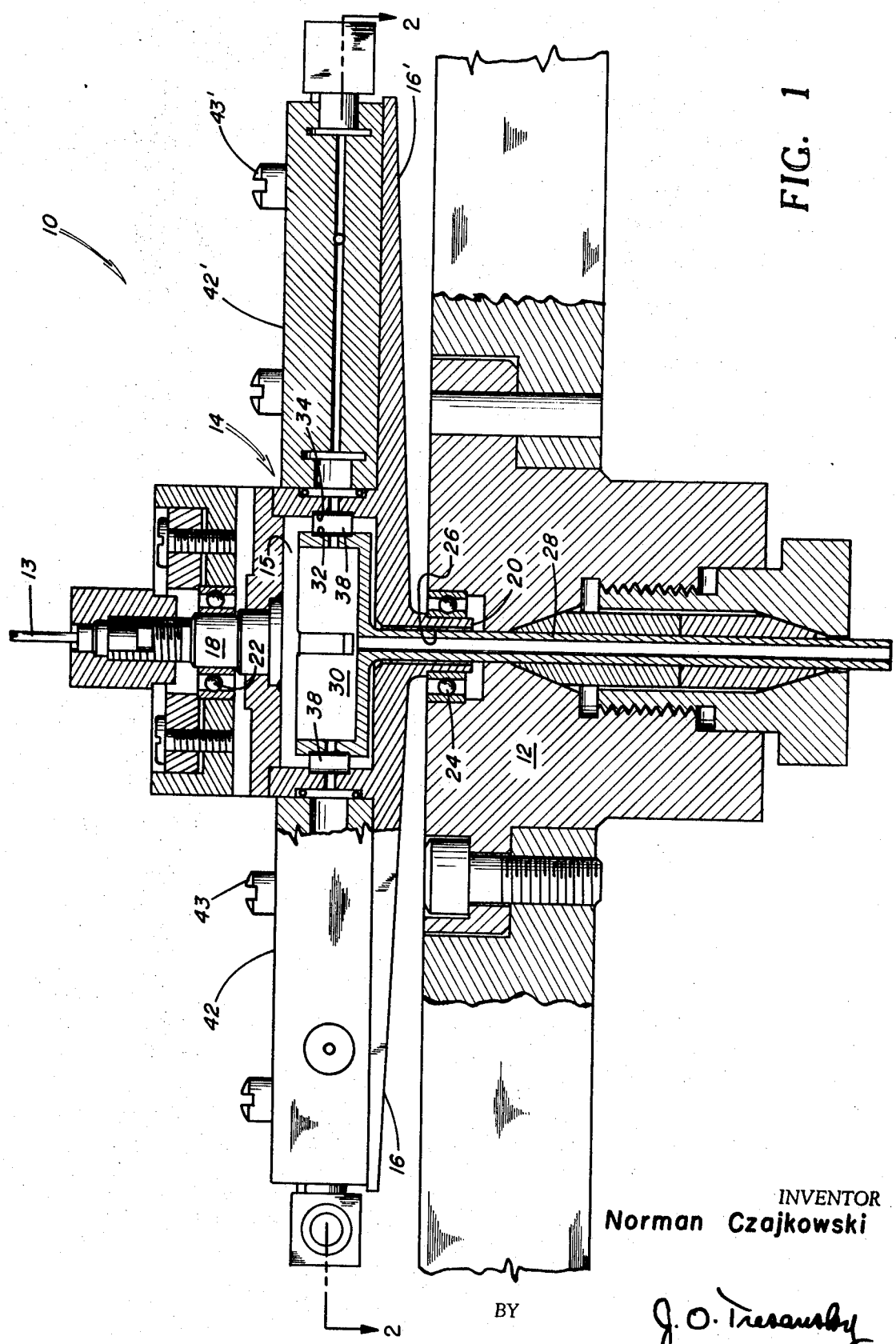
FIG. 1 is an elevational view, partly in section, of an oscillator and its mount according to the present invention.

Referring now to the drawings wherein like reference characters designate identical or corresponding parts throughout the several views, and more particularly to FIG. 1 thereof, wherein an oscillator 10 is shown mounted for oscillating rotation on a base 12. One end of a torsion spring 13 is rigidly attached to the oscillator and extends upward along the axis of rotation for attachment at its other end to a fixed support (not shown). Oscillator 10 has a central cylindrical hub 14 from which extends a pair of diametrically opposed arms 16 and 16'. A pair of cylindrical basses 18 and 20 extend above and below the hub coaxial with the axis of rotation of the oscillator. Bosses 18 and 20 are fixedly seated in low friction bearings 22 and 24, respectively, and rotate therein. Lower boss 20 has formed therethrough an axial bore 26 through which extends a low-pressure air line 28 fixed in base 12 by means of which a chamber 15 enclosed by hub 14 is pressurized. The outside diameter of air line 28 is slightly less than the inside diameter of bore 26 so that boss 20 can rotate about line 28 without touching it but with very close tolerance to prevent a serious pressure leak from chamber 15. A drum 30 is formed on the top of air line 28 and extends radially to slightly less than the inside diameter of hub chamber 15. A pair of broad, shallow annular grooves 32 and 34 are formed on the outside periphery of the drum 30 and the inside wall of hub 14, respectively. A pair of ribbon roll valves 36 and 38, best seen in FIG. 2, fit within grooves 32 and 34 and fill the annular space between hub 14 and drum 30. Axial shifting of the ribbon roll valves is prevented by engagement within grooves 32 and 34.

Figure 2:
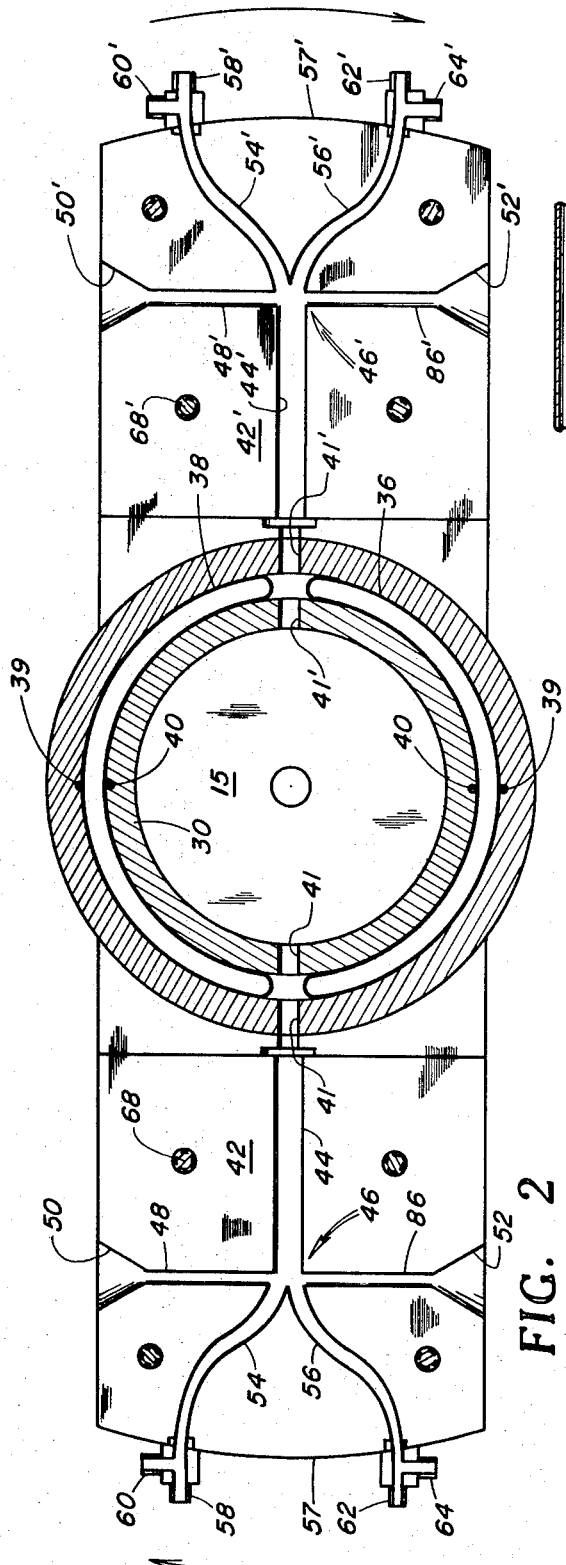
FIG. 2 is a sectional view along line 2-2 of FIG. 1.

As more clearly shown in FIG. 2, ribbon roll valves 36 and 38 consist of closed loops of flexible material such as thin spring steel, beryllium copper or a plastic such as Mylar. The outside run of each loop is fixed to the inside walls of hub 14 at 39 and the inside run of each loop is fixed to the outside periphery of drum 30 at 40. As the oscillator hub 14 oscillates about drum 30, the outside run of ribbon roll valves 36 and 38 turns with the hub and will periodically cover and uncover a pair of apertures 41 through hub 14. The apertures 41 are uncovered for only a few degrees of rotation on either side of the neutral position of the oscillator in which spring 13 is unstressed, as illustrated in FIG. 1. As the oscillator passes through its neutral position and the ribbon roll valve opens parts 41, a puff of pressurized fluid is released from hub chamber 15 through both parts 41 to fluidic elements 42 and 42' secured to opposed arms 16 and 16' by screws 43 and 43'.

The following description of fluidic element 42 made with reference to FIG. 2 will apply as well to identical fluidic element 42'. The elements and operation of fluidic element 42' represented by the primed numerals correspond exactly to those represented by the unprimed numeral of fluidic element 42.

The puff of pressurized fluid released through ports 41 is conveyed along a channel 44 to a fluidic interaction zone 46. Communicating with interaction zone 46 is a transverse channel 48 opening on both lateral sides of the fluidic element at flared intakes 50 and 52. A pair of ducts 54 and 56 communicate with interaction zone 46 and bifurcate therefrom to the radial end 57 of the fluidic element 42. Duct 54 terminates in radially and tangentially directed nozzles 58 and 60, respectively, while duct 56 terminates in radially and tangentially directed nozzles 62 and 64, respectively. The tangential jet provides periodic thrust increments sufficient to compensate for functional losses. The radial jet impinges against an escape lever (not shown) to trip an incremental advance of an escapement mechanism of a timer.

Figure 3:
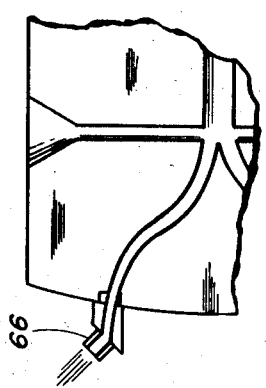
FIG. 3 is an elevational view, partly in section, of an alternative mounting for the oscillator.

An alternative embodiment, illustrated in FIG. 3, uses an obliquely directed nozzle 66 to replace the radially and tangentially directed nozzles. The jet directed by oblique nozzle 66 has a tangential component which provides the thrust increment to compensate for frictional losses and a radial component which acts against and trips an escape lever of an escapement mechanism of a timer.

Figure 4:
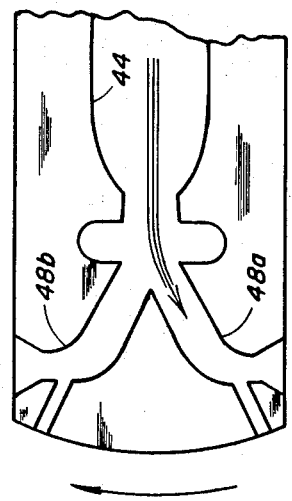
FIG. 4 is a fragmentary sectional plan view of an alternative nozzle mounting for the oscillator.

Another alternative embodiment illustrated in FIG. 4 combines the tangential nozzles 60 and 64 and ducts 54 and 56 with intakes 50 and 52 and channel 48. When the puff is released by the ribbon roll valves it is induced to take the downstream duct 48a by reason of the Coanda effect, and will exert its thrust opposite to the direction of rotation. Reverse rotation of the oscillator will induce a draft through ducts 48a and 48b in the opposite direction and the puff of fluid, when released, will follow duct 48b and exert its increment of thrust opposite to the direction of rotation.

Figure 5:
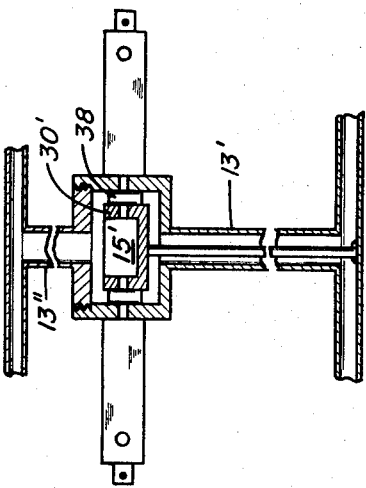
FIG. 5 is a fragmentary sectional plan view of an alternative design for the fluidic element.

An alternative support for oscillator 10 is illustrated in FIG. 5. Drum 30' is mounted on a narrow, rigid support rod 28' which extends through the bore of a hollow torsion spring 13' shown enlarged in diameter for clarity of illustration. A second coaxial torsion spring 13', also shown enlarged in diameter for ease of illustration, is fixed to the top of hub 14 and exerts an axial pull equal to and opposite to that of torsion spring 13'. Fluid such as air under pressure is admitted to the hub chamber 15' through the hollow torsion springs 13' and 13'' from the fluid pressure lines 17 to which they are fixed. The operation is otherwise the same as the embodiment of FIGS. 1 and 2.

In operation, oscillator 10 is displaced angularly and released. Torsion spring 13 provides an angular restoring force which swings the oscillator in the direction opposite to the initial displacement. As the oscillator passes through dead center, the ribbon roll valves 36 and 38 open ports 41 and 41' to allow a puff of pressurized fluid to pass from chamber 15 out through ports 41 and 41' to fluidic element 42 and 42'. At dead center the oscillator will have maximum angular velocity and the flow or draft of ambient air through transverse channel 48 will be maximum. At the interaction zone, the flow of air through channel 48 will cause the puff of pressurized fluid to follow duct 56 due to the Coanda effect. The puff of pressurized air will escape through radial jet 62 and tangential jet 64. As the oscillator continues its rotation beyond dead center, ribbon roll valves 36 and 38 will close ports 41 and hub chamber 15 will be resealed. The oscillator will continue to the end of its stroke and then will be returned by the energy stored in torsion spring 13. Rotation, now in the counterclockwise direction will induce an ambient draft from intake 52 to intake 50 which will cause the puff of air released by ribbon roll valves 36 and 38 through ports 41 and 41' as the oscillator passes through dead center to follow duct 54 and exit from nozzles 60 and 58. The energy increment supplied to overcome frictional losses is thereby automatically delivered precisely in phase and in the proper direction. Moreover, the tangentially directed jets from tangential nozzles 60-60' and 64-64' provide a balanced moment about the axis of rotation and cause no reaction force whatsoever. Therefore, support bearings 22 and 24 will experience no forces other than pure moment, and the frictional losses incident to rotation of the oscillator will be minimal. Whatever frictional losses are incurred in the bearings and the ribbon roll valves are compensated for by the reaction moment generated by the tangential jets. The radial nozzles 58 and 62 may be directed against an escapement lever of a conventional clockwork mechanism or any other means for registering the oscillations of the oscillator.

The operation of the oscillator is very conservative of the operating fluid. The conduit system through which the fluid is conveyed, i.e., air pipe 28, hub chamber 15, ports 41, channels 44, ducts 54 and 56, and the nozzles, is sealed by ribbon roll valves 36 and 38 for all but a few degrees of each stroke of the oscillation, hence the fluid is released slowly and is used efficiently.

Obviously, numerous variations and modifications of the above described best mode or preferred embodiment of the invention, defined by the appended claims, may be made.

What I claim as new and desired to be secured by Letters Patent of the United States is:

1. An oscillator, comprising:
   a base;
   a spring-mass system mounted for oscillating motion on said base about an axis;
   a first pair of fluid nozzles mounted on said spring-mass and directing jets having components parallel to the direction of oscillation and opposite to each other;
   conduit means connected between said fluid nozzles and a source of pressurized fluid for conveying fluid from the source to said nozzles; and,
   valve means disposed in said conduit means and moving with said mass for releasing a puff of pressurized fluid from said fluid nozzles for each cycle of oscillation to supply the energy increment needed to compensate for frictional losses.

2. The oscillator defined in claim 1, further comprising:
   a pair of radially directed fluid nozzles mounted on said spring-mass for directing a jet of fluid radially to provide an input to an oscillation registering mechanism.

3. The oscillator defined in claim 1, further comprising:
   a drum fixedly mounted on said base;
   said spring-mass system including a circular hub disposed coaxially to and enclosing said fixed drum and defining therein fluid port means communicating with said nozzles, and a torsion spring disposed coaxially with the axis of oscillation; and,
   said valve means comprising a ribbon roll valve disposed between said hub and said drum and which rolls with said hub to periodically release said puff of pressurized fluid to said nozzles.

4. The oscillator defined in claim 3, further comprising:
   a hollow cylindrical boss mounted coaxially on said hub for rotation in bearings mounted in said base;
   a fluid line fixed to said base and extending axially through the hollow center of said boss and connected at the other end to and supporting said drum.

5. The oscillator of claim 3, wherein:
   said torsion spring comprises an upper portion fixed at one end to the top of said hub and at the other end to a fixed support, and a lower, hollow portion connected at one end to the bottom of said hub and at the other end to said base;
   said drum includes a rigid support rod attached at one end to the center of said drum and extending through said hollow torsion spring to attachment to said base at the other end; and,
   said conduit means includes a fluid line communicating with said hollow torsion spring and through which pressurized fluid is supplied to said oscillator.

6. The oscillator of claim 3 wherein said ribbon roll valve comprises:
   a pair of closed loops of flexible material, both ends of which are disposed in juxtaposed spaced relation providing therebetween a gap for the escape of said puff of pressurized fluid when said gap is aligned with said fluid port means.

7. The oscillator defined in claim 1, further comprising:
   a second pair of fluid nozzles mounted diametrically opposed on said mass and directed parallel to the direction of oscillation and opposite to the direction of said first pair of nozzles.

8. The oscillator defined in claim 7, wherein said conduit means comprises:
   a fluidic interaction zone;
   a channel intersecting said interaction zone and extending parallel to the direction of oscillation to communicate with opposite lateral sides of said mass whereby an ambient draft is induced through said channel by reason of the oscillation of said mass; and,
   a pair of ducts bifurcating from said interaction zone and communicating with said first pair of nozzles.

9. The oscillator defined in claim 7, wherein said conduit means comprises:
   a fluidic interaction zone;
   a pair of ducts bifurcating from said interaction zone and communicating with said first pair of nozzles;
   whereby rotation of said mass will induce a draft through said ducts and across said interaction zone to induce said puff, when released, to follow said draft along one of said ducts to exit in a jet directed opposite to the direction of motion of said mass.

10. The oscillator defined in claim 7, further comprising:
    a drum fixedly mounted on said base;
    said spring-mass system including a circular hub disposed coaxially to and enclosing said fixed drum and defining therein fluid port means communicating with said nozzles, and a torsion spring disposed coaxially with the axis of oscillation; and
    said valve means comprising a ribbon roll valve disposed between said hub and said drum and which rolls with said hub to periodically release said puff of pressurized fluid to said nozzles.

11. The oscillator defined in claim 10, wherein said ribbon roll valve comprises:
    a pair of closed loops of flexible material, both ends of which are disposed in juxtaposed spaced relation providing therebetween a gap for the escape of said puff of pressurized fluid when said gap is aligned with said fluid port means.

12. The oscillator defined in claim 10 wherein said conduit means comprises:
    a fluidic interaction zone;
    a channel intersecting said interaction zone and extending parallel to the direction of oscillation to communicate with opposite lateral sides of said mass whereby an ambient draft is induced through said channel by reason of the oscillation of said mass; and,
    a pair of ducts bifurcating from said interaction zone and communicating with said first pair of nozzles.